United States Patent [19]

Murphy

[11] Patent Number: 4,501,300
[45] Date of Patent: Feb. 26, 1985

[54] CONTINUOUS CATHETER FLUSHING APPARATUS

[75] Inventor: John B. Murphy, West Roxbury, Mass.

[73] Assignee: Hewlett-Packard Company, Palo Alto, Calif.

[21] Appl. No.: 437,979

[22] Filed: Nov. 1, 1982

[51] Int. Cl.³ .............................................. F16K 7/12
[52] U.S. Cl. .................................... 138/46; 251/331; 239/533.13; 239/106; 137/244; 604/246
[58] Field of Search ..................... 251/331; 138/43, 45, 138/46; 239/533.13, 533.14, 106, 107; 137/242, 244

[56] References Cited

U.S. PATENT DOCUMENTS 3,326,242 6/1967 Parkison .............................. 138/46
4,023,595 5/1977 Zakay .............................. 138/46 X
4,304,260 12/1981 Turner et al. .................. 251/331 X

FOREIGN PATENT DOCUMENTS 2752549 6/1979 Fed. Rep. of Germany ...... 251/331

Primary Examiner—Arnold Rosenthal
Attorney, Agent, or Firm—Donald N. Timbie

[57] ABSTRACT

A valve is described having a ridge extending along a flat surface having holes therein and a base of elastic material compressed against the ridge and flat surface so as to define a channel of small cross-section communicating between the openings. A tab is connected to the side of the base of elastic material that is remote from the ridge and the flat surface so that a pull on the tab pulls the base away from the flat surface and enlarges the cross-section of the channel.

2 Claims, 5 Drawing Figures

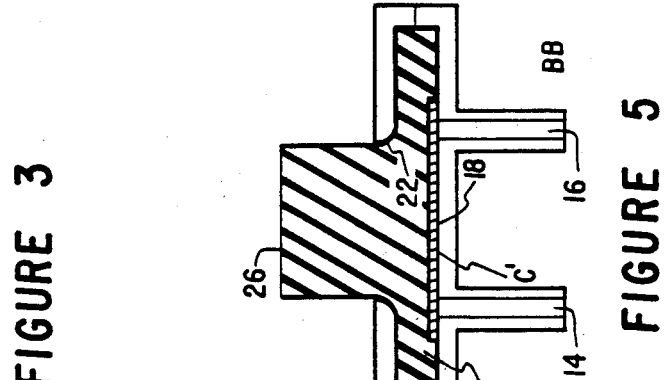
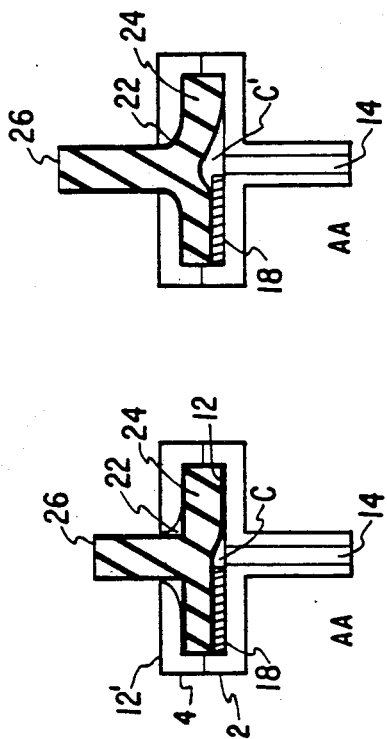
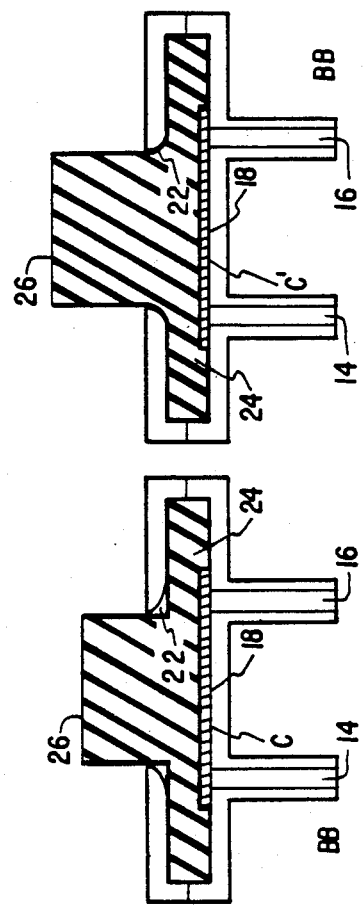
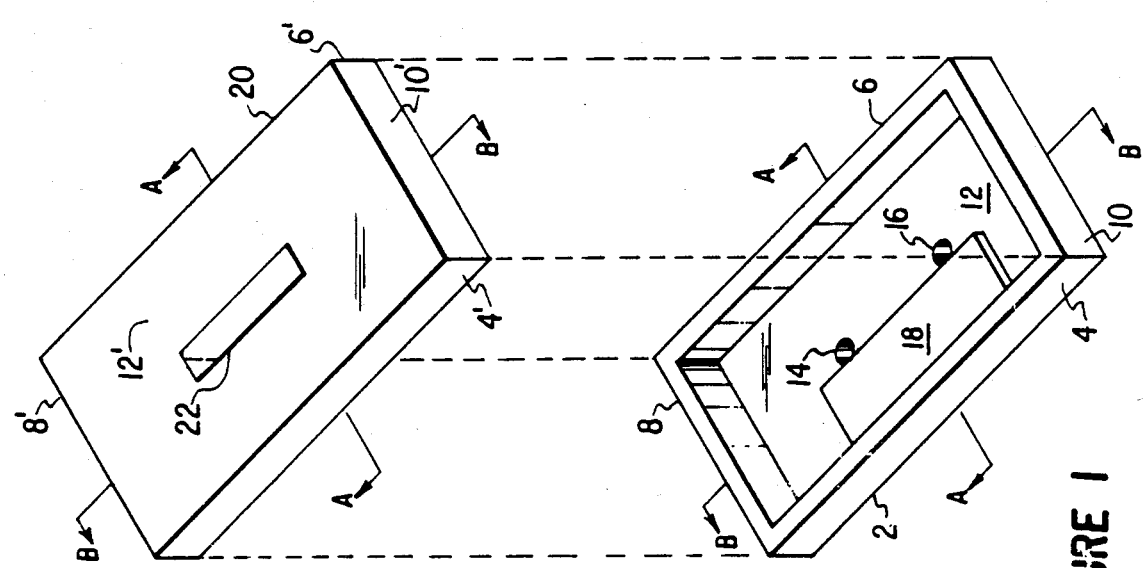

CONTINUOUS CATHETER FLUSHING APPARATUS

BACKGROUND OF THE INVENTION

In monitoring the internal blood pressure of a patient, one end of a catheter is inserted through the internal passageways of the blood circulation system until it reaches a desired point, and the other end is coupled by a pressure dome to a pressure transducer. The catheter and dome are filled with saline fluid so as to transmit the blood pressure to the transducer. In order to prevent occlusion of the inner end of the catheter by blood clotting, it has been found necessary to continuously provide a slow flush of saline solution. In spite of this, occlusion can occur after some time has passed so that it has been found necessary to remove any coagulation by periodically providing a fast flush of saline solution. Whereas the slow flush is so low as to have no deleterious effect on the patient, fast flush is high enough to be harmful if permitted to occur for more than a short time. For this reason, it is essential that the fast flush be provided only when the valve is held in the fast flush position by a technician and that the valve automatically reverts to providing a slow flush when the technician releases it.

Systems for providing both slow and fast flush have been devised in which the slow flush is obtained by connecting a source of pressurized saline fluid to the catheter via a tube having a small bore, and the fast flush is obtained by connecting a tube of large internal diameter in parallel with the small bore tube. The problem with such an arrangement is that if the small bore tube becomes clogged, there is no way to unclog it.

Another disadvantage of such a device is that it entraps air that interferes with the accuracy of the pressure measurements being made. The entrapment of air results from the necessity of providing pockets in the passageways that house and couple the tubes.

BRIEF SUMMARY OF THE INVENTION

This invention overcomes the aforesaid deficiencies by utilizing a valve having a channel of small cross-section for providing the slow flush and providing means for enlarging the cross-section of the channel when the fast flush is desired. Thus, if the channel becomes clogged during the continuous slow flush, it can be cleared by enlarging it to permit the fast flush to occur.

Briefly, a valve constructed in accordance with this invention is comprised of a cavity having two passageways in communication therewith and a ridge running along the interior surface of the cavity between the areas where the passageways enter it. Elastic material is compressed in the cavity so as to form a seal with the inner surface except where it is designed over the ridge. An opening is formed in the cavity at a point opposite the channel and a tab of the resilient material extends therethrough. Pulling the tab withdraws the elastic material from contact with a part of the sealing area so as to effectively enlarge the cross-section of the channel, and when the tab is released, the elastic material returns to its original position so that the cross-section of the channel is small once again. It is this latter operation that makes the valve failsafe. Should the small channel become clogged, it can be cleared when it is enlarged.

BRIEF DESCRIPTION OF THE DRAWINGS

FIG. 1 is an exploded projection of the halves of a valve housing constructed in accordance with this invention;

FIG. 2 is a section AA of the halves of the valve housing of FIG. 1 when assembled and shows the form of an elastic valve actuation member contained in the housing under a condition of continuous slow flush;

FIG. 3 is a section AA of the halves of the valve housing of FIG. 1 when assembled and shows the form of the elastic valve actuation member contained in the housing under a condition of periodic fast flush;

FIG. 4 is a section BB of the halves of the valve housing of FIG. 1 when assembled and shows the form of an elastic valve actuation member contained in the housing under a condition of continuous slow flush; and FIG. 5 is a section BB of the halves of the valve housing of FIG. 1 when assembled and shows the form of the elastic valve actuation member contained in the housing under a condition of periodic fast flush.

DETAILED DESCRIPTION OF THE INVENTION

In FIG. 1, the bottom half 2 of a valve housing is shown to be in the form of a rectangular box having side walls 4 and 6, end walls 8 and 10, and a bottom wall 12 having spaced openings 14 and 16 at indicated areas therein. A flat rectangular shim 18 is in contact with the bottom wall 12. One edge of the shim 18 bears against the side wall 4 and the other edge is tangent to the near sides of the openings 14 and 16 so as to form a ridge therebetween. Although not apparent in FIG. 1, the top half 20 of the valve housing is also in the form of a box having a top wall 12', side walls 4' and 6', and end walls 8' and 10'. When the halves 2 and 20 of the housing are assembled, walls bearing the same numerals are glued together so as to form a cavity within the housing halves 2 and 20. The bottom wall 12 and the inner side, now shown, of the top wall 12' are spaced opposed inner surfaces of the cavity. An opening in the form of a slit 22 is formed in the top wall 12' in such position that when the valve housing is assembled, the slit 22 is parallel to a line joining the centers of the openings 14 and 16. In the interest of clarity, an elastic valve actuating member that is to be contained within the housing 2, 20 when it is assembled is not shown.

FIGS. 2 through 5 show cross-sectional views of the valve housing when its bottom and top halves 2 and 20 are assembled as described. These figures also show an elastic valve actuating member having a flat rectangular base section 24 and a tab 26 extending perpendicularly therefrom. The rectangular base section 24 has a length of the interior of the longitudinal walls 4, 4' and 6, 6' of the housing and a width of the interior of the end walls 8, 8' and 10, 10' so that it lies flat on the bottom wall 12. The thickness of the base section 24 is such that when it is placed on the bottom wall 12 of the bottom half 2 of the housing and the top half 20 is brought down on the bottom half 2 with the tab 26 extending through the opening 22, the base 24 will be squeezed so as to form a seal with the bottom wall 12 at every point except along the ridge formed by the inner edge of the shim 18.

As seen in FIG. 2, the base section 24 drapes over the inner edge of the shim 18 so as to form a channel C of small cross-section communicating between the openings 14 and 16. When the tab 26 is pulled, the base section 24 is pulled away from the bottom wall 12 so as to enlarge the cross-section of the channel C as indicated at C' in FIG. 3 and diminish the area of the seal between the base section 24 and the bottom wall 12. The inner surfaces of the top wall 12' surrounding the edges of the slit 22 are curved as shown so as to permit the elastic valve actuation member 24, 26 to move away from the bottom wall 12 without undue stretching. When the channel C of FIG. 2 is enlarged as indicated at C' of FIG. 3, the flow of fluis between the openings 14 and 16 increases so as to clear away any matter in the channel C that may tend to clog it. At the same time, the increased flow will keep patent the inner end of a catheter, which is attached to one of the openings 14, 16. The mechanism is failsafe, however, because the cross-section of the channel C' of FIG. 3 decreases as indicated at C of FIG. 2 when the tab 26 is released.

FIGS. 4 and 5 are sections at BB of FIG. 1 when the valve is assembled and respectively illustrate the shape of the elastic valve member 24, 26 when the tab is not pulled and when it is. In these views, however, the difference in cross-section of the channels C and C' cannot be seen, but they do show that the channels communicate between the openings 14 and 16.

What is claimed is:

1. A valve assembly, comprising walls defining a cavity having first and second opposed inner surfaces, means defining two passageways communicating with said cavity at spaced areas of said first inner surface, means forming a ridge on said first inner surface and extending above it that is parallel to a line between said areas, a valve actuating member of elastic material having a base section and a tab extending therefrom, said base section being compressed between said first and second inner surfaces so as to form a seal with said first surface, said base section draping over said ridge so as to form a channel communicating between said passageways, and means defining an opening in the wall having the second inner surface, said tab extending through said opening to the outside of the valve assembly.

2. A valve assembly as set forth in claim 1 wherein said opening is in the form of a slit that is opposite a line joining said areas.

* * * * *